Patented Jan. 14, 1941

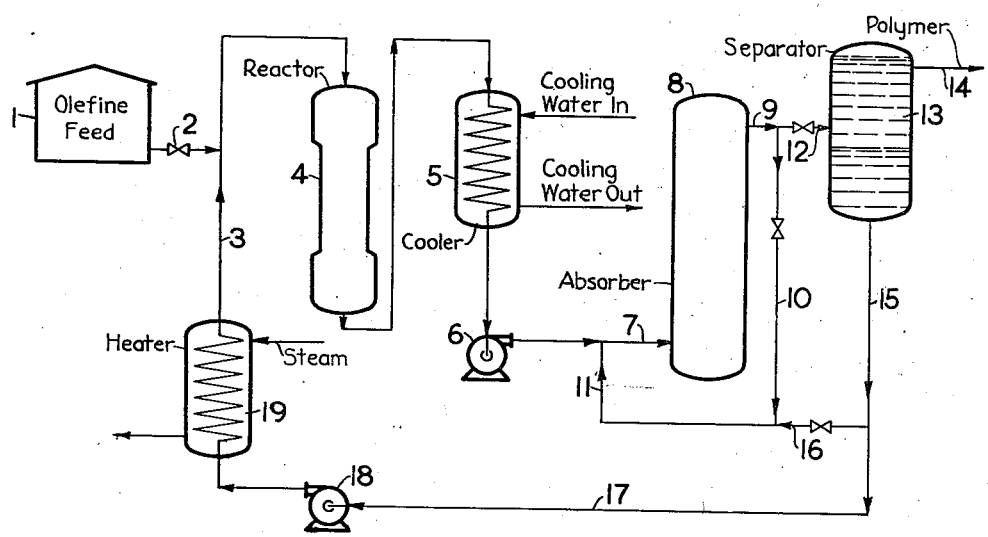

2,228,669

UNITED STATES PATENT OFFICE 2,228,669

POLYMERIZATION OF OLEFINS

Sumner H. McAllister, Lafayette, Calif., assignor to Shell Development Company, San Francisco, Calif., a corporation of Delaware Application November 25, 1938, Serial No. 242,271

8 Claims. (Cl. 260—683)

This invention relates to the manufacture of olefin polymers and is an improvement on methods of polymerizing olefins by absorbing them in suitable olefin polymerization agents and heating the resulting solutions as described, for example, in United States Patents 1,889,952 and 2,007,159. Such methods of producing olefin polymers have the disadvantage of giving low yields as a result of regeneration of unpolymerized olefin during heating of the absorbed olefin. Undesirably large amounts of higher polymers are also produced by these prior art methods.

It has been proposed to reduce olefin regeneration by operating under high pressure and to subject the absorbed olefin to only very short heating periods in order to reduce the amount of higher polymers formed. These methods of operation greatly increase the cost of equipment and operation and materially reduce plant capacity.

I have found that the disadvantages of prior olefin polymerization procedures may be overcome and higher yields of desired products, particularly olefin dimers, obtained without sacrifice of thruput rate or plant capacity. The process of my invention has the advantage of requiring only cheap standardized equipment and of reducing corrosion difficulties. It also eliminates loss of polymer with the unreacted hydrocarbon such as takes place in prior absorption methods. Still another advantage of the process of my invention is its flexibility which makes unnecessary the rigid control required in prior methods and results in substantial havings in supervision cost. A further advantage is the fact that it may be easily carried out in a highly selective manner so that undesired products resulting from side reactions with other olefins which may be present are much less than when former methods are used.

For the purpose of making my invention more clear it will be described with more particular reference to the manufacture of di-isobutylene from butane-butylene fractions obtainable from the products of petroleum cracking, using aqueous sulphuric acid as the polymerizing agent. It will be understood, however, that this is merely for purposes of illustration and implies no limitation on my invention as the same, or equivalent, procedures may be used for the polymerization of other mixtures containing tertiary and secondary olefins regardless of the source or other constituents of the mixture. Thus, tertiary olefins which may be present in the mixtures which may be used in the process of my invention include, in addition to isobutylene, trimethylethylene, unsymmetrical methyl ethyl ethylene, tetramethylethylene and the like while typical secondary olefins which may be present therewith are, for example, propylene, alpha and beta butylene, alpha and beta amylene, 2-methyl pentene-4, etc. The olefins may be used in a pure state of mixtures of one or more tertiary olefin with one or more secondary olefins or such mixtures containing other components such, for example, as paraffins and/or diolefins, etc., may be used. Particularly suitable are hydrocarbon fractions consisting of, or predominating in, hydrocarbons containing the same number of carbon atoms to the molecule altho non-isomeric mixtures containing tertiary and secondary olefins may also be used. Furthermore instead of sulfuric acid, other suitable strong mineral acids, such as phosphoric, benzene sulfonic, and like acids, for example, or their mixtures may be employed as polymerizing agent.

The attached drawing is a flow sheet or diagrammatic representation of one suitable method of carrying out the process of my invention. In the drawing I represents a storage tank or other source of olefin-containing hydrocarbon, for example, a butane-butylene fraction. Such olefin is fed by valved pipe line 2, in admixture with a suitable olefin polymerization agent containing absorbed olefin to be more fully described later, supplied by line 3, to reactor 4. Reactor 4 is maintained, if necessary, by suitable heating or cooling means not shown as sufficient control of the temperature may usually be secured by regulation of the feed rate alone, at a temperature at which a substantial part of the olefin, in the present case isobutylene, present in the hydrocarbon feed is polymerized during the reaction time adopted. Under these conditions the absorbed olefin present in the solution introduced thru line 3 is polymerized. For the selective polymerization of isobutylene in the presence of secondary butylenes using 55% to about 75% sulfuric acid as the polymerizing agent, temperatures of 70° C. to about 110° C. may advantageously be used in conjunction with reaction times of about 1 to 15 minutes whereby approximately half of the isobutylene present in the feed and substantially all of that introduced in absorbed form with the acid may be polymerized. From reactor 4 the reaction mixture is passed thru a cooler such as 5 wherein the temperature of the mixture is reduced to a point at which further polymerization is inhibited. The cooled solution is then pumped by pump 6 thru line 7 to an absorber such as 8, advantageously provided with means for controlling the absorption time such as recirculation lines 9, 10 and 11. For the selective absorption of isobutylene using 55% to 75% sulfuric acid the absorber is preferably maintained at about 20° to 40° C., for example, by means of cooling coils not shown. In such a case about 10 to about 30 minutes absorption time is suitable for substantially complete isobutylene absorption. From the absorber the mixture is drawn off thru valve controlled line 12 to a separator 13 where stratification is effected and the hydrocarbon phase containing the polymer produced is drawn off thru line 14. The acid phase containing absorbed isobutylene is taken off thru line 15 and a part preferably recycled to the absorber by valve controlled line 16 and recirculation line 11. The remaining olefin containing acid solution is then returned by line 17 and pump 18 to the polymerization system and recontacted with olefin in line 2 by means of line 3. In most cases the exothermic heat of the polymerization reaction is sufficient to maintain the desired temperature in reactor 4 but where such is not the case a heater such as 19 may be used to preheat the absorption product to the necessary extent before recontacting it with the olefin feed. Instead of preheating the absorption product, heater 19 may be installed in line 2 and the olefin feed heated. The entire system is preferably maintained under sufficient pressure to keep the hydrocarbon in the liquid state thruout the polymerization and absorption steps altho it is less important that the latter operation be carried out with liquid hydrocarbons.

This method of operation differs from previously suggested olefin polymerization procedures in that the first stage is a combination of polymerization by contact, with polymerization of previously absorbed olefins, in which no attempt is made to completely react the olefine in the hydrocarbon feed and the second stage is used to absorb the remaining olefine at a lower temperature, the absorption product being recycled as polymerization agent for the first stage.

The process may be carried out with any suitable type of apparatus. Thus reactor 4 may be a coil of appropriate capacity and tube diameter to provide the desired reaction time while permitting sufficient linear velocity to maintain the mixture in intimate contact and prevent phase separation. In such a case, the initial mixing of the recycled polymerization solution with the hydrocarbon may be effected in a jet, centrifugal pump or the like. Another suitable form of reactor is a jacketed tower filled with inert packing, such as porcelain chips or the like, which may likewise be fed, preferably at the top, with hydrocarbon and recycled absorption product from a mixing jet. Reactor 4 may also take the form of a suitable turbo mixer or other impeller driven mixing device, or the like. The same, or different types of apparatus may be used for the absorption stage after cooling. Batch, intermittent or continuous methods of operation may be adopted, although the latter is preferred.

The conditions of operation will depend upon the olefin or olefins being polymerized and the type of olefin absorption and polymerization agent chosen, as well as the degree of selectivity of olefin reaction desired. For highly selective polymerization of tertiary olefins such as isobutylene, tri-methyl ethylene and the like in the presence of secondary olefins, aqueous solutions of sulfuric acid and/or benzene sulfonic acid or the like are preferred, but aqueous phosphoric acid may be used also. With all of these polymerization agents, concentrations between about 50% and about 85% may be used, and with such solutions the polymerization is preferably carried out at temperatures of about 70° C. to about 120° C. the higher temperatures being used with the weaker polymerization agents and vice versa. The second stage of olefin absorption is always carried out at a lower temperature than that used in the polymerization stage, and preferably in the range of about 10° to about 50° C., the temperature in this case also being lower the stronger the acid.

The following results of typical tests made with the process of my invention show its advantages.

Example I

In a batch experiment using a bronze turbo mixer, a Dubbs butane-butylene fraction containing 18% isobutylene and 30% alpha and beta butylenes was reacted with a sulfuric acid solution having the composition corresponding to the absorption of 0.5 mol of isobutylene in 1 mol of sulfuric acid of 65% concentration. The volume of hydrocarbon charged to the mixer was that equivalent to 1.03 mols of isobutylene per mol of sulfuric acid in the acid solution used. The mixer was equipped with an internal coil to which steam was admitted as soon as the charge had been run in and the stirrer simultaneously started. The temperature rose rapidly to 70–80° C. and was held there for five minutes. The steam was then shut off, cooling water run through the coil and the stirrer stopped. After cooling to 30° C. the stirrer was started and the mixture stirred at 30–33° C. for 15 minutes longer to effect absorption of the unpolymerized isobutylene in the hydrocarbon. The reaction mixture was then stratified, the hydrocarbon and acid phases separated and analyzed with the following results:

Per cent of isobutylene charged which reacted_____ 88.0
Per cent of diisobutylene in the polymer produced_____ 87.0
Per cent of alpha and beta butylenes reacted_____ 15.0
Absorbed isobutylene in acid at end of experiment_____mols per mol of $H_2SO_4$__ 0.53

Example II

In a test of continuous operation according to the process of the invention, two identical turbo mixers of 840 cc. capacity, the first operated as the polymerizer and maintained at 80° C. and the second as a scrubber at 30–35° C. and connected in series by a water cooled condenser, were used. The calculated amount of 65% sulfuric acid was initially added to both polymerizer and scrubber. A separator connected to the outlet of the latter was then filled with a synthetic mixture of sulfuric acid and tertiary butyl alcohol representing the composition of the acid expected to be discharged from the scrubber. The system was filled with a liquid butane-butylene fraction and mixing and heating of the polymerizer started simultaneously with the start of flow of hydrocarbon to the system. The suction created by the mixers was sufficient to recycle the acid the return flow of which was maintained by adjusting the level of acid in the separator. Frequent samples were taken of the hydrocarbon in the polymerizer and scrubber and their composition determined. As soon as constant conditions were obtained, large samples of the exit hydrocarbon were taken and analyzed. At the end of the run the acid layer was analyzed. The following results were obtained.

| | | | |
|---|---|---|---|
| Polymerizer temperature °C | 79–85 | 80–86 | 79–81 |
| Average polymerization time min | 7 | 4.4 | 9 |
| Pressure, lbs. gauge | 195–200 | 200 | 200 |
| Average hydrocarbon feed rate, cc./min | 118 | 190 | 95 |
| Initial ratio acid to isobutylene | 0.92 | 0.74 | 0.74 |
| Volumes of hydrocarbon processed per volume of acid present | 38 | 34 | 26.7 |
| Feed analysis: | | | |
| isobutylene percent by wt | 18.7 | 18.5 | 18.5 |
| α and β butylene percent by wt | 28.4 | 28.7 | 28.7 |
| butanes percent by wt | 53.0 | 52.9 | 52.9 |
| Exit hydrocarbon analysis, percent by wt.: | | | |
| isobutylene | 2.8 | 3.3 | 2.6 |
| α and β butylene | 24.4 | 24.4 | 25.8 |
| butanes | 52.9 | 53.2 | 52.9 |
| polymer | 19.8 | 18.9 | 18.4 |
| butylenes as alcohol | 0.2 | 0.2 | 0.2 |
| Percent of isobutylene reacted | 84.7 | 82.0 | 85.6 |
| Percent of α and β butylenes reacted | 13.8 | 8.9 | 9.6 |
| Percent dimer in polymer | 87.5 | 89.5 | 88.8 |

Example III

Using as polymerizer a steam jacketed copper column packed with broken chips of porcelain, a butane-butylene fraction was reacted with an absorption product of isobutylene in sulfuric acid produced by agitating the cooled effluent from the polymerizer in a turbo mixer of the type used in Example I maintained at 25–30° C. In the polymerizer the mixing was that obtained by means of a mixing jet at the head of the column and the streaming effect of the acid and hydrocarbon over the packing. Positive flow of acid and hydrocarbon in the desired direction was obtained by the pressure differentials developed by the suction of the turbo mixer and the venturi effect of the mixing jet at the head of the column, making pumping unnecessary. The following results were obtained with a feed analyzing 18.7% isobutylene, 28.7% alpha and beta butylenes and 52.6% butanes, using 65% sulfuric acid and pressures of 250 to 275 pounds gauge.

| | | | |
|---|---|---|---|
| Polymerizer temperature °C | 90 | 87.5 | 100 |
| Average contact time, min.: | | | |
| in polymerizer | 2 | 2.5 | 2 |
| in absorber | 8.6 | 11.8 | 8.6 |
| Approximate ratio of acid to isobutylene in feed | 1/1 | 1/1 | 1/1 |
| Composition of hydrocarbon layer from separator after the absorber: | | | |
| isobutylene | 1.3 | 2.7 | 0.5 |
| alpha and beta butylenes | 27.3 | 27.1 | 27.4 |
| butanes | 52.6 | 52.6 | 52.6 |
| polymer | 18.8 | 17.6 | 19.5 |
| Percent isobutylene reacted | 93.2 | 85.6 | 97.3 |
| Percent secondary butylenes reacted | 4.9 | 5.6 | 4.5 |
| Weight percent of polymer as dimer | 79.6 | 79.5 | 78.1 |
| Percent isobutylene fed recovered as dimer | 80.3 | 74.7 | 81.3 |

In explanation of the more advantageous results obtainable by the process of my invention as compared with prior methods of producing olefin polymers by absorbing olefins in acid and heating the resulting absorption product, the following significant differences are pertinent. The excess hydrocarbon present during polymerization acts as an inert diluent suppressing trimer formation and also as an extractant for the dimer removing it from the acid phase as fast as formed so that it has less opportunity for further reaction to form trimer. Thus, a 4–5% increase in the amount of diisobutylene produced may be obtained by the use of solvents as shown by the following results obtained in comparative tests on the polymerization of absorbed isobutylene in the presence and absence of hydrocarbon solvents for the polymers produced.

Example IV

| Solvent | H₂SO₄ strength | Olefin acid ratio | Maximum temp. | Polymerization time | Weight percent of absorbed isobutylene recovered as polymer | Weight percent of polymer as dimer | Volume ratio of solvent to polymer produced at 25° C. |
|---|---|---|---|---|---|---|---|
| | Percent | | °C. | Minutes | | | |
| None | 65.5 | 0.99:1 | 108 | 5 | 90.0 | 69.71 | |
| Pentane | 64.8 | 1.01:1 | 108 | 5 | 95.4 | 73–75 | 5.1:1 |
| Iso-octane | 64.8 | 1.02:1 | 105 | 5 | 96.1 | 74–75 | 5.1:1 |

Second, there is present in the polymerization zone a high ratio of olefin to acid which has been found to favor dimer formation, and in the absorption zone a high ratio of acid to olefin is present favoring rapid absorption. Thus in a system where the ratio of acid to olefin in the feed is 1:1 the ratio in the polymerizer will be 1:1.5 if 50% polymerization of the feed olefin is being effected while in the absorber the ratio will be 2:1. Another important factor contributing to the success of my improved olefin polymerization process is the fact that it may be economically conducted without carrying the polyerization to completion so that an excess of olefin is present thruout the polymerization. This excess olefin has a mass action effect which suppresses regeneration of absorbed olefin making the polymerization of such olefin more efficient. Also since polymerization by simultaneous absorption and polymerization such as carried out in the first stage of my process proceeds rapidly at first but is slow to bring to completion, my novel arrangement in which no attempt is made to complete the polymerization, has the advantage that all the polymerization is carried out under conditions corresponding to the first rapid stages of the reaction. This has the further advantages not only of promoting higher yields of dimers as I have found that the proportion of higher polymers increases as the polymerization approaches completion but also of reducing undesirable side reactions, e. g. reaction of secondary olefins and generation of SO₂ where sulfuric acid is used, which increase with the reaction time. Still another advantage of my process is that it makes possible the necessary mixing and transfer of materials by pumping only cold relatively non-corrosive materials as in the process of Example III thus eliminating the use of moving parts under hot corrosive conditions.

It will thus be evident that the process of my invention offers many advantages over prior methods of olefin polymerization and that it is capable of wide variation not only in regard to the olefin and/or olefins which may be polymerized and the olefin polymerization catalysts which may be used but also with respect to the conditions and methods employed in both the polymerization and absorption steps. For example, instead of simply passing the entire reaction mixture from the polymerizer to the absorber, the polymer produced may first be separated, for example, by installing separator 13 in the line connecting cooler 5 with pump 6 and distilling the resulting hydrocarbon phase to separate polymer from unreacted hydrocarbon before recontacting such hydrocarbon with the acid layer from the separator. Instead of stratification, centrifugal separation may be used in either of the described methods of operation. Still other modifications may be made in the process of the invention which will therefore be understood as not limited to the details of operation described nor by any theory advanced in explanation of the improved results achieved but only by the terms of the accompanying claims in which it is intended to claim all novelty inherent therein as broadly as possible in view of the prior art.

I claim as my invention:

1. In a process of selectively polymerizing isobutylene in the presence of alpha and beta butylenes wherein isobutylene is absorbed in sulphuric acid of 55% to about 75% concentration at a temperature of about 50° C. to about 10° C. and the resulting absorption product is maintained at a temperature between about 110° C. and about 70° C. for a time of about 1 to about 15 minutes at which polymerization of absorbed olefin takes place, the method of increasing the yield and quality of the polymerization product which comprises contacting the isobutylene and alpha and beta butylene-containing feed to the system in the liquid phase with said absorption product under said polymerization conditions, cooling the resulting mixture to said absorption temperature, agitating the cooled mixture for a time within the range of about 10 to 30 minutes at which substantial absorption of unreacted isobutylene in said acid takes place without substantial polymerization, separating unabsorbed hydrocarbon from the resulting absorption product and contacting the latter with fresh feed under said polymerization conditions.

2. In a process of producing an olefin polymer, the steps of absorbing a tertiary olefin in aqueous sulfuric acid of 50% to about 85% strength at a temperature of about 50° to about 10° C. at which substantially no polymerization of said olefin takes place separating unabsorbed hydrocarbon and bringing the resulting absorption product to a polymerization temperature in the range of about 70° C. to about 125° C. in the presence of at least an equal amount of the same tertiary olefin in the liquid state.

3. In a process of producing an olefin polymer, the steps of absorbing an olefin in an aqueous solution of a strong polybasic mineral acid of polymerization strength at a temperature at which substantially no polymerization of said olefin takes place separating unabsorbed hydrocarbon and bringing the resulting absorption product to polymerization temperature in the presence of a hydrocarbon solvent for the polymer produced in the liquid state.

4. A process of producing an olefin polymer which comprises absorbing at least 0.5 mols of said olefin per mol of acid in sulphuric acid of 50% to about 85 % concentration at about 50° to about 10° C. and contacting the absorption product with hydrocarbon containing at least an equal amount of said olefin in the free liquid state at a temperature between about 70° C. and about 125° C. for a time of about 1 to about 15 minutes at which substantial polymerization of said olefin takes place.

5. In a process of producing hydrocarbons boiling in the gasoline range from a butane-butylene fraction of hydrocarbon cracking products wherein said fraction is contacted in the liquid phase with sulphuric acid under polymerizing conditions, the improvement which comprises agitating the butylene-containing hydrocarbon layer from said polymerization with concentrated sulphuric acid at a temperature below that at which substantial olefin polymerization takes place for a period of at least ten minutes, separating unabsorbed hydrocarbon from the acid phase, contacting at least a part of the latter with said butane-butylene fraction under said polymerization conditions and recovering hydrocarbons boiling in the gasoline range from said separated hydrocarbon.

6. In a process of producing hydrocarbons boiling in the gasoline range from normally gaseous olefin-containing hydrocarbons wherein said olefin-containing hydrocarbon is contacted in the liquid phase with sulphuric acid under polymerizing conditions, the improvement which comprises agitating the hydrocarbon layer from said polymerization containing unreacted olefin with concentrated sulphuric acid at a temperature below that at which substantial olefin polymerization takes place for a period of at least ten minutes, separating the resulting mixture into a hydrocarbon phase and an acid phase, recycling acid phase to contact with said normally gaseous hydrocarbon under said polymerization conditions and recovering gasoline boiling hydrocarbons from the hydrocarbon phase.

7. In a process of producing a higher boiling hydrocarbon from an olefin wherein hydrocarbon containing said olefin in the liquid phase is contacted with a strong polybasic inorganic acid under polymerization conditions, the improvement which comprises agitating at least a part of the hydrocarbon layer from said polymerization containing unreacted olefin with said acid for at least ten minutes at a temperature below that at which substantial olefin polymerization takes place, separating the resulting mixture into a hydrocarbon phase containing said higher boiling hydrocarbon and an acid phase and carrying out said polymerization with at least a part of said separated acid phase.

8. In a process of producing an olefin polymer, the steps of absorbing an olefin in an aqueous solution of sulphuric acid of polymerization strength at a temperature at which substantially no polymerization of said olefin takes place, separating unabsorbed hydrocarbon from the absorption product, adding a hydrocarbon solvent for said polymer to the separated absorption product and bringing the mixture to polymerization temperature.

SUMNER H. McALLISTER.